United States Patent [19]

Otonari et al.

[11] Patent Number: 4,871,784

[45] Date of Patent: Oct. 3, 1989

[54] MINUTE-CELLULAR POLYESTER FILM

[75] Inventors: Satoshi Otonari; Yoshinori Sato, both of Machida; Narihiro Masuda; Tomoyuki Kotani, both of Yokohama, all of Japan

[73] Assignee: Diafoil Company, Limited, Tokyo, Japan

[21] Appl. No.: 245,318

[22] PCT Filed: Feb. 5, 1988

[86] PCT No.: PCT/JP88/00110

§ 371 Date: Sep. 15, 1988

§ 102(e) Date: Sep. 15, 1988

[87] PCT Pub. No.: WO88/05797

PCT Pub. Date: Aug. 11, 1988

[30] Foreign Application Priority Data

Feb. 5, 1987 [JP] Japan .................................. 62-25245

[51] Int. Cl.$^4$ ............................ C08J 9/32; C08J 9/36; B29C 55/12
[52] U.S. Cl. .................................... 521/138; 264/154; 264/210.7; 264/288.8; 264/290.2; 521/97
[58] Field of Search .................. 521/97, 138; 264/154, 264/210.7, 288.8, 290.2

[56] References Cited

U.S. PATENT DOCUMENTS 3,903,234  9/1975  Ikeda et al. ....................... 264/288.8
4,814,124  3/1989  Aoyama et al. .................... 264/288.8

Primary Examiner—Morton Foelak
Attorney, Agent, or Firm—Linda M. Buckley; David G. Conlin

[57] ABSTRACT

The polyester film according to the present invention is produced by molding a composition comprising an aromatic polyester, 3 to 40 wt %, based on the amount of said polyester, of a crystalline polypropylene having a melt flow index of 0.2 to 120, and 0.001 to 3 wt %, based of the total amount of said polyester and said polypropylene, of a surface-active agent into a sheet; and stretching the thus obtained sheet at least one direction. The polyester film according to the present invention, which is obtained by the above process is low in the apparent specific gravity because of a large number of minute closed cells contained therein. Further, the polyester film according to the present invention shows a high opacifying power by adding a small amount of titanium oxide or without adding the titanium oxide, which have been added in a large amount. The polyester film can be used as the materials for printing plates and substrates in data devices.

7 Claims, No Drawings

MINUTE-CELLULAR POLYESTER FILM

TECHNICAL FIELD

This invention relates to a polyester film fabricated so as to contain numerous minute cells in the surface and inner parts thereof. More particularly, this invention relates to a stretched polyester film which has a lowered apparent specific gravity owing to formation therein of minute closed cells and is excellent in whiteness and in mechanical strength, and especially in opacifying properties.

BACKGROUND ART

Heretofore, polyester films have been found extensive utility in various industrial fields owing to their excellence in mechanical properties, electrical properties, resistance to chemicals, weathering properties, and resistance to heat. Particularly the biaxially stretched polyethylene terephthalate film excels other films in planarity, dimensional stability and modulus of elasticity, and, therefore, it constitutes itself an indispensable materials for printing plates and for substrates in data devices.

The information industries have been remarkably advance in recent years and a number of new devices and articles of various kinds have been developed. Among such devices, there mentioned the electronic white board which have completely changed the concept of the conventional black board. The electronic white board is free from dust of chalk, therefore, is helpful for air cleaning for offices and meeting rooms. Further, an electronic white board provided with a copying device is accepted as an epoch-making article which contributes to the efficiency of meeting. In addition, the advent of the cashless age has brought about increased spread of magnetic cards such as cash card, telephone card, etc.

Biaxially stretched polyethylene terephthalate films provided with white color and high opacifying properties by the addition of a white pigment such as titanium oxide powder are conventionally used as one of the important materials for the above articles.

These films under mentioned are used in the important part of the final product, i.e. used as the copy board part of the electronic white board and as the substrate for magnetic cards due to their excellent planatory and dimentional stability. In these electronic white board and magnetic cards, the films are fully manifesting their outstanding properties mentioned above.

Indeed these films has highly desirable properties. They nevertheless suffer from various drawbacks because they require to contain a white pigment in a very large amount for the purpose of acquiring an enhanced opacifying properties. Since these films contain inorganic particles such as titanium oxide particles having a lagre specific gravity in a ratio exceeding 10% by weight, they have an apparent specific gravity exceeding 1.7 g/cm$^3$, occasionally exceeding 2.0 g/cm$^3$, and a weight per unit volume becomes 20 to 50% larger than that of their regular counter-types containing no pigment. This causes heavy labor during the work of slitting, transporting or packing in the course of the production of film products.

In the case of the white board mentioned above, the phenomenon of sagging of the board surface with aging is caused during long-term use, thereby seriously impairing the commercial value of the white board.

Moreover, the large amount of inorganic particles added to the polyester film contribute to increase the rigidity of the film and cause a problem that the film edges are liable to inflict lacerations on operative's hands in the flim slitting process and the cutting process of a product such as magnetic card. Thus, polyester films containing a large amount of such inorganic particles have difficulties in terms of handling properties. The present inventors started a study on a process for producing cellular film from the view point that it is most important for solving the above problems to find out a method for reducing the apparent specific gravity of the film. That is, the reduction of the apparent specific gravity was attempted by providing a film with cellular structure by employing a method in which a cellular product which is used as heat insulating material and cushioning material is produced by incorporating gas (bubble) into thermoplastic resins.

Hitherto, a number of methods has been proposed for producing cellular polyester. For example, a method of incorporation of a gas or a gasifiable substance disclosed in Japanese Patent Application Laid-Open (KOKAI) No. 50-38765(1975), Japanese Pat. Publication No. 57-46456 and Japanese Patent Application Laid-Open (KOKAI) No. 57-34931; a method of incorporation of a substance capable of generating a gas chemical decomposition disclosed in Japanese Patent Application Laid-Open (KOKAI) No. 52-43871 (1977) and Japanese Patent Publication No. 58-50625 (1983); and a method which comprises mixing a material for film with a substance soluble in a solvent, forming the resultant mixture in the form of a film, impregnating the film in the solvent to extract the substance from the film as disclosed in Japanese Patent Application Laid-Open (KOKAI) No. 51-34963(1976) and Japanese Patent Publication No. 52- 27666(1977) can be cited.

However, it was difficult to apply these method directly to the production of biaxially stretched polyester. These methods cited above are those for producing molded articles of certain extent of size. Any of the methods cited above is difficult to be called as a method able to control the cell diameter to a few tens μm or less and to uniform size in consideration of film thickness. Further, these methods can be said to be a method of great difficulty in biaxially stretching an extruded sheet without breaking of the sheet. Mentioned above can be presumed from the fact that these methods have rarely proposed in the specification of patent which relates to biaxially stretched cellular polyester film.

Although, the application of the conventional method for cellular product is very difficult, the formation of minute cell in biaxially stretched polyester film is still effective for reduction of apparent specific gravity.

Further, the formation of a large number of minute cells having a diameter of a few tens μm to a few μm, preferably a diameter corresponds to a wave length of visible light in polyester film can additionally provide the polyester film with a high opacifying properties due to scattering of transmitted light by the cells formed. This, therefore, can promote the reduction of the apparent specific gravity as well as can avoid the rigidity of the polyester film, since the amount of the white pigment can be decreased. Therefore, if it is possible to obtain such a polyester film, the heavy labor during the work of handling can be reduced and can prevent the phenomenon of sagging of film by its weight, so called aging phenomenon.

The present inventors have proposed a process for producing such a cellular polyester film in Japanese Patent Application No. 61-313896(1986), without being swayed by the conventional method for producing cellular products. This process comprises extruding-molding a mixture prepared by adding a specific polypropylene to an aromatic polyester into a sheet, stretching the sheet at least in one direction, thereby obtaining a polyester film containing minute cells in the surface and inner parts thereof. Thus, the reduction of the apparent specific gravity has been achieved by forming minute cells in films by the method quite different from the conventional methods. Additionally, this method is easily reduced to practical use without imparing the productivity, therefore, the invention providing such method is epoch-making.

However, although the method is epochal in forming minute cells in films, it is not necessarily sufficient in opacifying properties of films and the films obtained by the method are obliged to greatly decrease its mechanical strength. In the circumstances, it has been desired to develop a method for making cells formed in the surface and inner parts of film into minute cells in order to provide the film with more high opacifying power.

DISCLOSURE OF INVENTION

The present inventors, in consideration of this circumstances, have continued a study on a method for making cells formed in a film into minute cells, and as a result, have found that the cells formed can be made minute by adding a specific compound as well as a specific polypropylene, as proposed previously, into an aromatic polyester. The present invention has been accomplished based on the finding.

The present invention relates to a polyester film containing minute cells having a diameter of 1 to 300 $\mu$in the surface and inner parts thereof, which is produced by extruding-molding an aromatic polyester mixed with 3 to 40 wt % of a crystalline polypropylene having a melt flow index of 0.2 to 120 and 0.001 to 3 wt % of a surface active agent into a sheet, stretching the sheet at least one direction.

The present invention will be described below in more detail.

The term "polyester" as used in the present invention refers to a polyester which is produced by poly-condensing an aromatic dicarboxylic acid such as terephthalic acid, isophthalic acid, or naphthalene dicarboxylic acid or an ester thereof with a glycol component such as ethylene glycol, diethylene glycol, 1,4-butanediol and neopentylene glycol.

Besides being produced by direct reaction of an aromatic dicarboxylic acid with a glycol component, the polyester can be produced by subjecting an alkyl ester of an aromatic dicarboxylic acid and a glycol component to transesterification and subsequently polycondensing the product of transesterification, or by polycondensing a diglycol ester of an aromatic dicarboxylic acid. Polyethylene terephthalate, polyethylene-2,6-naphthalate, and polybutylene terephthalate can be cited as typical example of the polyester.

This polyester may be either a homopolyester or a copolyester resulting from copolymerization using a third comonomer. In any case, the polyester used in the present invention is preferred to contain not less than 70 mol %, preferably not less than 80 mol %, and more preferably not less than 90 mol %, of at least one constitutional repeating unit of ethylene terephthalate unit and/or ethylene-2,6-naphthalate unit and/or butylene terephthalate unit.

When the polyester has an unduly low degree of polymerization, the produced film has insufficient mechanical strength. The polyester, therefore, is preferred to have an intrinsic viscosity of not less than 0.4, preferably 0.5 to 1.2, and more preferably 0.55 to 0.85.

When a film is formed of the conventional polyester, the polyester is fabricated so as to contain minute inactive particles as an agent for imparting surface roughness to the produced film so that the produced film will retain required slipping property between films or between the film and a metallic roll, thereby reducing the coefficient of friction and preventing the impairment of the productivity and handling workability. The polyester to be used in the present invention is preferred not to contain such minute inactive particles. This because such minute inactive particles, when contained in the film have the possibility of hindering a desired control of the whiteness and the opacifying properties of the film to be obtained. The polyester containing these minute inactive particles may be used, however, when the minute inactive particles have no adverse effect on the properties which the film to be produced is expected to show.

The crystalline polypropylene homopolymer to be used in the polyester is a polymer comprising at least 95 mol %, preferably at least 98 mol % of propylene unit. As the other constitutional unit to be contained, ethylene unit, butylene unit and isoprene unit may be mentioned.

A copolymer which contains ethylene unit over 5 mol % is not preferred because the amount of minute cells to be formed is extremely low and the reduction of the apparent specific gravity can not be sufficiently achieved.

The melt flow index of the polypropylene is preferred to fall in the range of 0.2 to 120, preferably in the range of 0.5 to 50. If the melt flow index is less than 0.2, the cells to be formed are so large that the sheet will readily sustain fracture during the course of stretching. Conversely if the melt flow index exceeds 120, the sheet, while being stretched with a tenter, slips off the clips to bring about the disadvantage that the productivity of the method will be jeopardized.

The amount of the propylene to be incorporated is preferred to fall in the range of 3 to 40 wt %, preferably 5 to 30 wt % based on the amount of the aromatic polyester. If this amount is less than 3 wt %, the amount of minute cells to be produced is not sufficient and the reduction of the apparent specific gravity becomes difficult. Conversely, if this amount exceeds 20 wt %, the molded sheet sustains fracture during the course of stretching due to the excess amount of the formed minute cells.

The surface-active agent, important component in the present invention, is used for forming cells which is minimized in size in the film. The film produced form a mixture of polyester and polypropylene, previously proposed in Japanese Pat. Application No. 61-313896(1986), is provided with a certain extent of an opacifying properties by forming cells having a diameter of a few tens $\mu$m to 100 $\mu$m. The use of the surface-active agent enables to minimize the cell size, thereby improving the opacifying power of the film.

The surface-active agent under discussion is an agent which is readily concentrated at an interface between two substances and brings about remarkable change in the nature of the interface between the two substances, i.e., the interface between an aromatic polyester and a polypropylene, and has an activity to enhance the compatibility between an aromatic polyester and a polypropylene.

Examples of the surface-active agent include anionic surfactants, cationic surfactants, amphoteric surfactants, and nonionic surfactants.

As examples of the anionic surface-active agent carboxylates such as alkali metal salts of natural fats and fatty oils and alkali salts of lauric acid, stearic acid, oleic acid, etc.; salts of sulfuric ester such as alkali metal salts of higher alcohol-sulfuric esters, alkali metal salts of higher alkyl ether-sulfuric esters, sulfonated oils, sulfonated carboxylic esters and sulfonated olefin; sulfonates such as alkali metal salts of alkylbenzensulfonic acids, alkali salts of alkylnaphthalenesulfonic acids, alkali metal salts of paraffin-sulfonic acids, Igepon T and Aerosol OT; and phosphoric ester salts such as alkali metal salts of mono- or diesters of phosphoric acid with higher alcohol and phosphoric metal salts of an adduct of higher alcohol-ethylene oxide can be cited. As examples of the cationic surface-active agent, salts of amines such as lauryl amine, stearyl amine and rosin amine; and quaternary ammonium salts such as lauryltrimethyl ammonium chloride, benzalkonium chloride and Sapamine MS can be cited. As examples of the amphoteric surface-active agent, amino acid derivatives such as methyl laurylaminopropionate and sodium laurylaminopropionate; and betaines such as stearyl dimethyl betaine and lauryl dihydroxyethyl betaine can be cited.

As examples of the nonionic surface-active agent, polyalkylene glycols such as nonylphenylethylene oxide n-mol adducts and laurylalcoholethylene glycol n-mol adducts; and polyhydric alcohols such as lauric acid monoglyceride, pentaerythritol monopalmitate, and sorbitansteraric triester; and silicon type surface-active agent such as polyalkylene oxide adducts of organopolysiloxane and dimethylsiloxane and polycondensate of vinylsilane and polyalkylene polyol can be cited.

In the present invention, although any one of the above-cited surface-active agent can be used, the nonionic surface-active agent, especially, silicon type is preferably used. As the silicon type surface-active agent, organopolysiloxane-polyoxyalkylene copolymers and alkenylsiloxanes having polyoxyalkylene side chains may be mentioned. The method for producing or the chemical structure of such silicon type surface-active agent is disclosed in Japanese Patent Publication Nos. 35-10543(1960), 37-8850(1962), 38-347(1963), 38-6000(1963), 38-7149(1963), 40-12190(1965), 40-12310(1965), 41-3559(1966), 41-5954(1966), 41-5955(1966), 42-2719(1967), 42-3117(1967), 42-4997(1967), 42-11678(1967), 42-13635(1967-), 43-3717(1968), 43-13758(1968), 43-16399(1968) and 43-17998(1968).

In the present invention, at least one of the surface-active agent mentioned above is used in an amount of 0.001 to 3 wt %, preferably 0.005 to 1 wt %, more preferably 0.01 to 0.5 wt % based on the total amount of an aromatic polyester and a crystalline polypropylene. An amount of less than 0.001 wt % leads to an insufficient opacifying power because a remarkable minimization of the cell size can not be achieved. On the other hand, an amount of over 3 wt % is responsible for bleed-out of the surface-active agent into the surface of the film when the final film is produced, thereby causing an inferior adhesive properties to printing ink and an inferior stain resistance.

The aromatic polyester described above is mixed with the crystalline polypropylene and the surface-active agent in the present invention, and further, the stretching step at least one direction is essential for the purpose of the present invention, that is, the formation of a large number of minute closed cells in the surface and inner parts of the final film. This because that minute cells are not formed in the surface and inner parts of a sheet which is obtained by merely extruding-molding the mixture above and are not formed until the sheet is subjected to stretching, while the mechanism of the formation of cells is not clearly understood.

Since the size of cells to be formed is depends on the size of the polypropylene dispersed in the polyester, the surface-active agent serves to minimize the size polypropylene by enhancing the compatibility between the polyester and the polypropylene, and as the result, the minimization of the size of the formed cells is achieved. The stretching method is not special one and any method employed in the production of usual polyesters may be employed in the present invention. Namely, the minute-cellular polyester film according to the present invention can be produced by melting and kneading the mixture as the starting material in an extruder at a temperature of 250° to 300° C., extruding the mixture from a die into a shape of sheet, cooling the sheet to a temperature below about 70° C. to obtain a substantially amorphous sheet, stretching the sheet in the machine direction and/or transverse direction in an areal ratio of not less than 4 times, preferably not less than 9 times, and subjecting the stretched sheet to heat treatment at a temperature of 120° to 250° C.

The method for preparing the mixed starting material is not specifically restricted and a method in which the polyester chips, polypropylene chips and the surface-active agent are mixed together in advance, then, the mixture is introduced into a hopper of a extruder may be employed, however, a method in which a master-chip is prepared in advance by mixing the surface-active agent in a high concentration into the polyester, then, the polyester chips, polypropylene chips and the master-chips of the surface-active agent are mixed together is preferably used. As the method for preparing the master-chip, a method in which the surface-active agent is added during the polycondensation reaction for producing the polyester, and a method in which the polyester and the surface-active agent are kneaded together in an extruder to be formed into chips may be employed.

Further, a method in which the polyester chips and the master-chips of the surface-active agent are mixed in advance, then the mixed chips and the polypropylene chips are respectively fed into the entrance for introduction in an extruder in a constant ratio is especially preferable due to a low possibility of ununiform mixing and an easy operation.

The present invention has been accomplished basically by mixing the polyester, polypropylene and the surface-active agent, however, there is no problem in adding a third component such as additives as far as the effect attained by the present invention is not impaired by such addition.

As the examples for such a third component, antioxidant, ultraviolet absorbent, pigment, dye, lubricant, matting agent, fluorescent whitening agent, etc. may be exemplified, and added by a suitable method according to necessity in a necessary amount.

The thickness of a minute-cellular polyester film is generally 5 to 500 μm, however in the present invention, is preferably 5 to 250 μm, more preferably 10 to 150 μm.

The thus obtained polyester film according to the present invention shows an apparent specific gravity which is reduced to an extent of as the case may be, half of the apparent specific gravity of the conventional polyester film, because a large number of minute cells having a diameter of 1 to 300 μm, preferably 5 to 100 μm is formed in the surface and inner parts thereof. Thus, the apparent specific gravity of the polyester film according to the present invention is 0.4 to 1.3 g/cm$^3$, preferably 0.6 to 1.3 g/cm$^3$ and the heavy labor during the handling work can be reduced, and also the accident of an incised wound on laborer's hands by film edges due to, may be, the buffer effect derived from the formation of cells.

The polyester film according to the present invention shows an extremely high opacifying power because the film contains far more minimized cells compared with the film proposed in Japanese Patent Application No. 61-313896, that is, the opacifying power of the polyester film according to the present invention, as defined below, is 0.2 to 5, preferably 0.4 to 3. Thus, according to the present invention, the amount of the white pigment such as titanium oxide, which is hitherto an essential component, is greatly reduced or the use thereof is not necessitated. This has enabled to avoid the deterioration of productivity due to the decrease in the stretching ratio and the decrease in the frequency of breaking by the addition of the pigment, thereby achieving the improvement in the yield and the rate of production.

Further, the polyester film according to the present invention is prevented in the decrease in mechanical strength because contains cells more minute than those contained in the film of the previous invention. Thus, the polyester film according to the present invention shows a breaking strength of 1 to 50 kg/mm$^2$, preferably 3 to 30 kg/mm$^2$, and is capable of being used as thin-gage products such as packaging films and decorative films.

BEST MODE FOR CARRYING OUT THE INVENTION

The present invention will be described below more in detail, referring to the Examples. The present invention is not limited to the scope of the Examples, so far as not exceeding the scope of the gist of the present invention. The measurement of the characteristics and the estimation of the film forming properties are carried out according to the following method in the present invention.

(1) Apparent specific gravity (g/cm$^3$); A 10×10 cm square was cut as a sample from a desired part of a given film. The volume of this sample was calculated using the average thickness obtained by measuring thicknesses thereof at nine arbitrarily chosen points of the sample with a micrometer and averaging the values of measurement. The sample was weighed and the weight thereof per cm$^3$ was reported as an apparent specific gravity of the given film. This determination was conducted on five samples and the average of five values was employed as the result of the determination.

(2) Opacifying power; By the use of a densitometer, Macbeth TD-904 model, the density of transmitted light through a given film was measured under Filter G to find the opacifying power. The numerical value thus found increases with increasing opacifying power.

(3) Whiteness degree b value; The measurement was carried out with an ND-K5 type color difference meter produced by Nippon Denshoku Co., Ltd. The number of determination, n, was 3, and the averaged value of the obtained values was employed as the measured values. This numerical value increases on (+) side with increasing yellowness and is usually used as an index for the degree of whiteness.

(4) Glossiness (%); The measurement was carried out with a VG-107 type glossmeter produced by Nippon Denshoku Co., Ltd. according to JIS Z-874 method. The measurement was conducted in the condition of the incidence angle of 60° and the reflection angle of 60°, using a standard black plate as the standard. The number of determination, n, was 3, and the averaged value was employed as the measured value.

(5) Surface roughness, Ra (μm); By the use of a surface roughness tester produced by Kosaka Kenkyusho, Ltd. and marketed under product code of "SE-3F", the determination was carried out according to Japanese Industrial Standard (JIS) B-0601-1976. The conditions of determination were 2 μm of probe diameter, 30 mg of probe contact pressure, 0.8 mm of cutoff value, and 2.5 mm of length of measurement. The number of determination, n, was 12 and the values of n=10 after omitting the largest and smallest values were averaged. The average was reported as the center line averaged surface roughness Ra.

(6) Coefficient of dynamic friction μd; The measurement was carried out according to ASTM D-1894. Two pieces of film to be tested, one of which was placed on the other, on a plain glass plate were loaded and the contact pressure between two films was adjusted to 2 g/cm$^3$ The frictional force between two films was measured by running the upper film against the lower film at a speed of 40 mm/min. The coefficient of friction at the running distance of 5 mm was employed as the coefficient of dynamic friction 82 d. The number of determination was 10 and the averaged value was employed as the measured value.

(7) Heat shrinkage; The film was subjected to heat treatment at a temperature of 180° C. for 5 min in a strainless condition. The heat shrinkage was calculated from the measured length of the film before and after the treatment according to the following formula.

$$\text{Heat Shrinkage (\%)} = \frac{\left(\begin{array}{c}\text{length before} \\ \text{heat treatment}\end{array}\right)^{mm} - \left(\begin{array}{c}\text{length after} \\ \text{heat treatment}\end{array}\right)^{mm}}{(\text{length before heat treatment})^{mm}} \times 100$$

(8) Tensile strength at break (kg/mm$^2$); The stress at break was measured in the condition that the width of the sample film was 15 mm, a strain rate of 100%/min by using a tensile machine produced by Intesco Co. The number of determination, n, was 5, and the tensile strength at break was obtained by converting the averaged value to the strength per a unit cross sectional area.

(9) Ink adhesive properties;

On the surface of a given film, a mixture prepared from 40 parts by weight of a polyester grade ink of Lamipak LPNST(indigo blue) (produced by Toyo Ink Co.) and 60 parts by weight of a diluent was solid-applied with a #8 bar coater and the applied layer of the ink was dried at 80° C. for 2 min to form an ink printing layer. The sample thus prepared was left standing overnight at 23° C. and 50% RH. Then, an adhesive tape (produced by Nichiban K.K.) was applied to the surface of the ink printing layer and was peeled off instantaneously from one end. After this peeling, the adhesive strength of the ink printing layer to the film was visually rated on the following 5-point scale:

5: Complete absence of peeling of the ink printing layer from the film.
4: Peeling of a very small part of the ink printing layer from the film.
3: Peeling of a part of the ink printing layer from the film.
2: Peeling of practically all the ink printing layer from the film
1: Peeling of the entire ink printing layer from the film.

(10) Evaluation of clip-off; An amorphous sheet was stretched in the transverse direction after the stretching in the machine direction by using a tenter. During the stretching in the transverse direction, slipping off of the film stretched in the machine direction from the clip for fixing the film edges was observed and evaluated based on the three ranks below. This evaluation, in similarly to the next item (11), relates to a continuous film forming properties, and is very important in judging whether the productivity is good or bad.

Rank ○ Substantially no clip-off, good productivity.
Rank Δ; Some clip-off, inferior productivity.
Rank X; The film was very slippery and clip-off occurred, less productivity.

(11) Evaluation of breaking frequency; Breaking frequency during the stretching with tenter as in the item (10) or during the heat-setting was observed and evaluated based on the following three ranks.
Rank ○ Substantially no breaking and good productivity.
Rank Δ; Some breaking and inferior productivity.
Rank X; Breaking occurred always and less productivity.

(12) Melt flow index M.F.I. (g/10 min); M.F.I. was measured according to JIS K-6758-1981. The value of M.F.I. increases with increasing melt viscosity of a polymer.

EXAMPLE 1

A raw material prepared by uniformly mixing polyethylene terephthalate chips having an intrinsic viscosity $[\eta]$ of 0.658 with 10 wt % of crystalline polypropylene chips having a melt flow index (M.F.I.) of 5.5 and 0.2 wt % of a silicone type surface-active agent (SH 193; trade name, produced by Toray Silicone Co.) was melted at 290° C. and extruded with an extruder onto a cooling drum at 40° C. to obtain an amorphous sheet of 650 μm in thickness. Then this sheet was stretched in the machine direction at a ratio of 2.9 times and in the transverse direction at a ratio of 3.2 times and was heat treated at a temperature of 245° C. for 6 sec to obtain a biaxially stretched film of 100 μm thickness. The film forming properties during the stretching and the characteristics of the final film are shown in Table 1.

As shown in Table 1, clip-off and breaking frequency during film forming step were found to have the ranks and any deterioration in productivity was not observed. The thus obtained final film had an apparent specific gravity of 1.01, while that of the polyester film containing white pigment of Comparative Example 1 was 1.78. The results of microscopic observation on the cross section of the films showed that a large number of minute closed cells having a diameter of 5 to 30 μm were formed in the film, while the diameter of the cells formed in the film containing no surface-active agent, as in Comparative Example 2, was 20 to 80 μ. The film obtained was found to have an opacifying powder of 0.85, b value of +0.8 and a glossiness of 57%, and was a white film showing a higher surface glossiness and a higher opacifying power compared with the film of Comparative Example 2. The strength at break of the film was 18 kg/mm$^2$, while that of the film of Comparative Example 2 was 11 kg/mm$^2$, indicating that the film obtained in Example 1 was extremely improved in strength at break. The film obtained was an excellent biaxially stretched polyester film having further characteristics of Ra of 0.18 μm, μd of 0.25, a heat shrinkage of 1.9% and ink adhesive properties rated by rank 4.

EXAMPLE 2

A biaxially stretched film was obtained in the same manner as in Example 1, except for using 5 wt % of a crystalline polypropylene having an M.F.I. of 1.3 instead of polypropylene used in Example 1, changing the amount of the surface-active agent(SH 193) to 0.6 wt %, and further adding 0.03 wt % of fluorescent whitening agent. The film forming properties of the film was good as in the case of Example 1, as shown in the following Table 1. The characteristics of the obtained film are shown in Table 1. As shown in Table 1, the film had an opacifying power of 0.76, indicating the superiority in opacifying properties to the films of Comparative Examples 2 and 5. The b value of the film was −3.7 and the film was a white film excellent in whiteness degree. From the result of the microscopic observation on the cross section of the film, the formation of a large number of minute cells having a diameter of 10 to 40 μm was confirmed.

EXAMPLE 3

A biaxially stretched film was obtained in the same manner as in Example 1, except for using a raw material prepared by uniformly mixing polyethylene chips of $\eta = 0.660$ containing 0.5 wt % of calcium carbonate particles having an average particle size of 0.7 μm with 15 wt % of crystalline polypropylene of M.F.I.=25 and 0.05 wt % of silicone type surface-active agent (trade name of F 305, produced by Sinetsu Silicone Co.). The film forming properties and the characteristics of the obtained film are shown in Table 1. The film forming properties are good as in the case of Examples 1 and 2, as shown in Table 1. The film was found to have minute closed cells having a diameter of 10 to 40 μm by the microscopic observation on the cross section of the final film, indicating more minute cells compared with those of Comparative Example 2. The opacifying power of the film was 1.12, showing the excellency in opacifying properties, the apparent specific gravity was 0.81, indicating the sufficient reduction of the weight, and mechanical strength (strength at break) was retained a level of 15 kg/mm$^2$.

EXAMPLE 4

A biaxially stretched film was obtained in the same manner as in Example 1, except for using 8 wt % of crystalline polypropylene of M.F.I.=9.8 in stead of polypropylene used in Example 1 and 0.3 wt % of K-534 (trade name, produced by Union Carbide Corp.) as a silicone type surface-active agent in stead of SH 193, and further adding 3 wt % of titanium oxide particles having an average particle size of 0.3 μm. The film forming properties and the characteristics of the obtained film are shown in Table 1. The film had an opacifying power of 1.05 and was a white film excellent in opacifying properties as in the case of Examples 1 to 3. The diameter of the cells formed in the film was 5 to 30 μm, and surface roughness due to the formed cells and the added titanium oxide particles was observed. The film forming properties of the obtained film was good as in the case of Examples 1 to 3.

COMPARATIVE EXAMPLE 1

By the use of a biaxial extruding machine provided with a vent, polyethylene terephthalate chips of [η]=0.658 was blended with 40 wt % of titanium oxide pigment having an average particle size of 0.3 μm to obtain a master-batch chips. A raw material prepared by mixing the polyethylene terephthalate chips and 37.5 wt % of the master-batch chips was subjected to the same treatment as in Example 1 to obtain a biaxially stretched film. As shown in Table 1, the film forming properties of the film was rank Δ for the brasking frequency because large amount of the added titanium oxide caused frequent breaking, whereas, rank ○ for clip-off, indicating an inferior productivity. The apparent specific gravity of the final film was 1.78, indicating that the weight of the film per an unit volume was extremely high. Although, the film had a desirable opacifying power of 1.23, was inferior in whiteness degree as shown by b value of +3.5. Further, the film was inferior in slipping properties because μd of the film was 0.51 owing to the flatness of the film surface represented by Ra of 0.12 μm and glossness of 85%. As the result of the microscopic observation on the cross section of the film, the existence of closed cells, which were formed in the film of Examples 1 to 4 and Comparative Examples 2 to 5, was not recognized.

COMPARATIVE EXAMPLE 2

A biaxially stretched film was obtained in the same manner as Example 1, except for using no silicone type surface-active agent(SH 193) used in Example 1. As the result of the microscopic observation on the cross section of the film, the existence of a large number of closed cells having a diameter of 20 to 80 μm was recognized. The film was reduced in its weight as evidenced by an apparent specific gravity of 0.99, however, inferior in opacifying properties as shown by an opacifying power of 0.46 due to the large diameter of the cells. Further, the film had a rough surface as seen from Ra of 0.35 μm.

COMPARATIVE EXAMPLE 3

A biaxially stretched film was obtained in the same manner as in Example 1, except for changing the amount of silicone type surface-active agent to 0.0003 wt %. The diameter of the cells formed in the film was similar to that of Comparative Example 1, i.e., 20 to 80 μm, therefore, the opacifying power was 0.49 indicating that practically no improvement in opacifying properties was achieved as in the case of Comparative Example 1.

Comparative Example 4

A biaxially stretched film was obtained in the same manner as in Example 1, except for changing the amount of silicone type surface-active agent to 5 wt %. The film forming properties are shown in Table 1. Clip-off was rate by rank Δ because of occational clip-off in tenter, indicating an inferior productivity. The film was inferior in ink adhesive properties, as shown in Table 1, due to bleedout of the surface-active agent, which was added in a large amount, into the surface of the film.

COMPARATIVE EXAMPLE 5

A biaxially stretched film was obtained in the same manner as in Example 1, except for using 5 wt % of crystalline polypropylene of M.F.I.=150 in stead of the polypropylene used in Comparative Example 2. As shown in Table 1, clip-off and breaking of the film frequently occurred during the film forming step, indicating an inferior film forming properties.

COMPARATIVE EXAMPLE 6

The same procedure as in Example 1 was repeated except for using 10 wt % of crystalline polypropylene of M.F.I.=0.1. However, no biaxially stretched film was obtained due to frequent breaking of films.

TABLE 1

| Examples and Comparative Examples | Polymer Composition | | | | | | Film forming properties | |
|---|---|---|---|---|---|---|---|---|
| | Crystalline polypropylene | | Surface-active agent | | Other additives | | | |
| | M.F.I. g/10 min | Amount Part by weight % | Kind | Amount Part by weight % | Kind | Amount Part by weight % | Clip-off | Breaking frequency |
| Example 1 | 5.5 | 10 | SH193 | 0.2 | — | — | ○ | ○ |
| Example 2 | 1.3 | 5 | SH193 | 0.6 | Fluorescent whitening agent 0.7 μ | 0.03 | ○ | ○ |
| Example 3 | 25 | 15 | F305 | 0.05 | CaCO$_3$ 0.3 μ | 0.42 | ○ | ○ |
| Example 4 | 9.8 | 8 | L-5340 | 0.3 | TiO$_2$ 0.3 μ | 3 | ○ | ○ |
| Comparative Example 1 | — | — | — | — | TiO$_2$ | 15 | ○ | Δ |

TABLE 1-continued

| | | | | | | | | |
|---|---|---|---|---|---|---|---|---|
| Example 2 | 5.5 | 10 | — | — | — | — | ○ | ○ |
| Comparative Example 3 | 5.5 | 10 | SH193 | 0.0003 | — | — | ○ | ○ |
| Comparative Example 4 | 5.5 | 10 | SH193 | 5 | — | — | Δ | ○ |
| Comparative Example 5 | 150 | 5 | — | — | — | — | Δ | Δ |
| Comparative Example 6 | 0.1 | 10 | — | — | — | — | ○ | X |

| | Characteristics of stretched film | | | | | | | |
|---|---|---|---|---|---|---|---|---|
| Examples and Comparative Examples | Apparent specific gravity g/cm$^3$ | Opacifying power — | b value — | Glossiness % | Ra μm | μd — | Heat shrinkage % | Tensile strength at break kg/mm$^2$ | Ink adhesive properties — |
| Example 1 | 1.01 | 0.85 | +0.8 | 57 | 0.18 | 0.25 | 1.9 | 18 | 4 |
| Example 2 | 1.19 | 0.76 | −3.7 | 52 | 0.19 | 0.25 | 2.1 | 20 | 4 |
| Example 3 | 0.81 | 1.12 | +0.5 | 48 | 0.20 | 0.23 | 1.8 | 15 | 5 |
| Example 4 | 1.08 | 1.05 | +1.2 | 61 | 0.19 | 0.24 | 1.7 | 19 | 4 |
| Comparative Example 1 | 1.78 | 1.23 | +3.5 | 85 | 0.12 | 0.51 | 1.7 | 22 | 5 |
| Comparative Example 2 | 0.99 | 0.46 | +1.0 | 30 | 0.35 | 0.22 | 2.0 | 11 | 4 |
| Comparative Example 3 | 0.98 | 0.49 | +0.9 | 31 | 0.33 | 0.21 | 2.1 | 10 | 5 |
| Comparative Example 4 | 1.00 | 0.80 | +0.7 | 50 | 0.17 | 0.25 | 2.0 | 17 | 2 |
| Comparative Example 5 | 1.21 | 0.35 | +0.8 | 35 | 0.31 | 0.23 | 2.3 | 12 | 3 |
| Comparative Example 6 | — | — | — | — | — | — | — | — | — |

We claim:

1. A polyester film containing minute closed cells having a diameter of 1 to 300 μm in the surface and inner parts thereof, which comprises an aromatic polyester, 3 to 40 wt %, based on the amount of said polyester, of a crystalline polypropylene having a melt flow index of 0.2 to 120, and 0.001 to 3 wt %, based on the total amount of said polyester and said polypropylene, of a surface-active agent, wherein the film is stretched at least one direction of the machine and transverse directions.

2. The polyester film according to claim 1, wherein said crystalline polypropylene comprises not less than 95 mol % of propylene unit as the constitutional repeating unit.

3. The polyester film according to claim 1 or 2, wherein said surface-active agent is one selected from the group consisting of anionic surface-active agents, cationic surface-active agents, amphoteric surface-active agents and nonionic surface-active agents.

4. The polyester film according to any one of claims 1 to 3, wherein said polyester film is produced by molding a composition comprising said polyester, 3 to 40 wt %, based on the amount of said polyester of said crystalline polypropylene having a melt flow index of 0.2 to 120, and 0.001 to 3 wt %, based on the total amount of said polyester and said polypropylene, of said surface-active agent, into a sheet.

5. The polyester film according to any one of claims 1 to 4, wherein the apparent specific gravity of said polyester film is 0.4 to 1.3 g/cm$^3$.

6. The polyester film according to any one of claims 1 to 5, wherein the opacifying power obtained by measuring the density of transmitted light under Filter G is 0.2 to 5.

7. The polyester film according to any one of claims 1 to 6, wherein the strength at break of said polyester film is 1 to 50 kg/mm$^3$.

* * * * *